United States Patent
Lin

[11] Patent Number: 6,134,978
[45] Date of Patent: Oct. 24, 2000

[54] TRANSMISSION MECHANISM FOR A SCANNER

[76] Inventor: Bob Lin, No. 9, Lane 102, San-Min Rd., Taipei, Taiwan

[21] Appl. No.: 08/969,614

[22] Filed: Nov. 13, 1997

[51] Int. Cl.7 .............................. F16H 27/02; F16H 7/00; B41J 25/304

[52] U.S. Cl. ........................ 74/89.22; 358/293; 400/320; 474/73

[58] Field of Search ................................ 74/89.22, 89.21, 74/37, 52; 353/108, 109; 399/202, 211, 208, 210; 355/75; 358/496, 498, 293; 347/37; 346/139 R, 139 B; 400/82, 320, 322, 323; 474/73, 74

[56] References Cited

U.S. PATENT DOCUMENTS

| | | | |
|---|---|---|---|
| 2,705,427 | 7/1955 | Schipper | 74/37 |
| 3,273,408 | 9/1966 | Nagel et al. | 74/37 |
| 4,116,568 | 9/1978 | Suzuki et al. | 400/320 |
| 4,403,877 | 9/1983 | Jones et al. | 400/320 |
| 4,429,333 | 1/1984 | Davis | 358/293 |
| 4,804,285 | 2/1989 | Bradford | 400/320 |
| 5,830,094 | 11/1998 | DeNijs | 74/89.22 X |

*Primary Examiner*—John A. Jeffery
*Assistant Examiner*—Marcus Charles
*Attorney, Agent, or Firm*—Bacon & Thomas

[57] ABSTRACT

A transmission mechanism which includes a pair of gears bilaterally disposed at one end of a scanning path defined inside a scanner, a first pair of fixed pulleys respectively and fixedly mounted on the gears, a second pair of fixed pulleys bilaterally disposed at an opposite end of the scanning path, a pair of movable pulleys synchronously moved along the scanning path, and a flexible transmission member mounted on the fixed pulleys and the movable pulleys subject to a designed order for power transmission for permitting the movable pulleys to be moved synchronously along the scanning path. By means of changing the revolving direction of the gears and the tangential velocity of the first fixed pulley and second fixed pulley, a different speed ratio is obtained.

3 Claims, 8 Drawing Sheets

6,134,978

1

TRANSMISSION MECHANISM FOR A SCANNER

BACKGROUND OF THE INVENTION

The present invention relates to a transmission mechanism for a scanner, and more particularly to such a transmission mechanism which drives movable mechanisms of a scanner along a scanning path at a designed speed ratio.

In a regular scanner, as shown in FIG. 1, light from a light source is projected onto document and then reflected by document onto first reflector means, and then reflected by first reflector means to lens means through second and third reflector means, and then focused by leans means onto charge coupled device means. The light source and first reflector means form a scanning mechanism. The second and third reflector means for a reflecting mechanism moved along a scanning path in parallel to document. Further, a transmission mechanism is provided to move the scanning mechanism and the reflecting mechanism at a predetermined speed ratio. Various transmission mechanisms including screw transmission mechanism, gear transmission mechanism, belt transmission mechanism, etc., have been disclosed for this purpose. FIGS. 2A and 2B show a transmission mechanism for this purpose according to the prior art. This transmission mechanism comprises pulley type transmission unit and a belt type driving unit. The scanning mechanism is fixedly mounted on a fixed point at a rope of the pulley type transmission unit. The reflecting mechanism is pivoted to a movable pulley of the pulley type transmission unit. The pulley type transmission unit is driven by the belt type driving unit to move the scanning mechanism or the reflecting mechanism. The speed ratio between a fixed point at the rope of the pulley type transmission unit and the movable pulley is set at 2:1. When the belt type driving unit is started to move the scanning mechanism or reflecting mechanism, the scanning mechanism is moved, and the optical path between document and the charge coupled device is constantly maintained unchanged. However, because this design can only provide a speed ratio of 2:1, it application range is limited.

SUMMARY OF THE INVENTION

The present invention provides a new design which uses a pulley type transmission mechanism to move the scanning mechanism at a designed speed ratio. The design of the speed ration can be changed subject to different applications. According to the present invention, the transmission mechanism comprises a first gear (belt wheel) and a second gear (belt wheel) bilaterally disposed at one end of a scanning path defined inside a scanner, a first fixed pulley and a second fixed pulley respectively and fixedly mounted on the first gear (belt wheel) and the second gear (belt wheel), a third fixed pulley and a fourth fixed pulley bilaterally disposed at an opposite end of the scanning path, a first movable pulley and a second movable pulley synchronously moved along the scanning path, and a flexible transmission member mounted in proper order on the first fixed pulley, the first movable pulley, the second fixed pulley, the fourth fixed pulley, the second movable pulley and then the third fixed pulley. By means of changing the revolving direction of the gears and the tangential velocity of the first fixed pulley and second fixed pulley, a different speed ratio is obtained.

2

Figure 1:
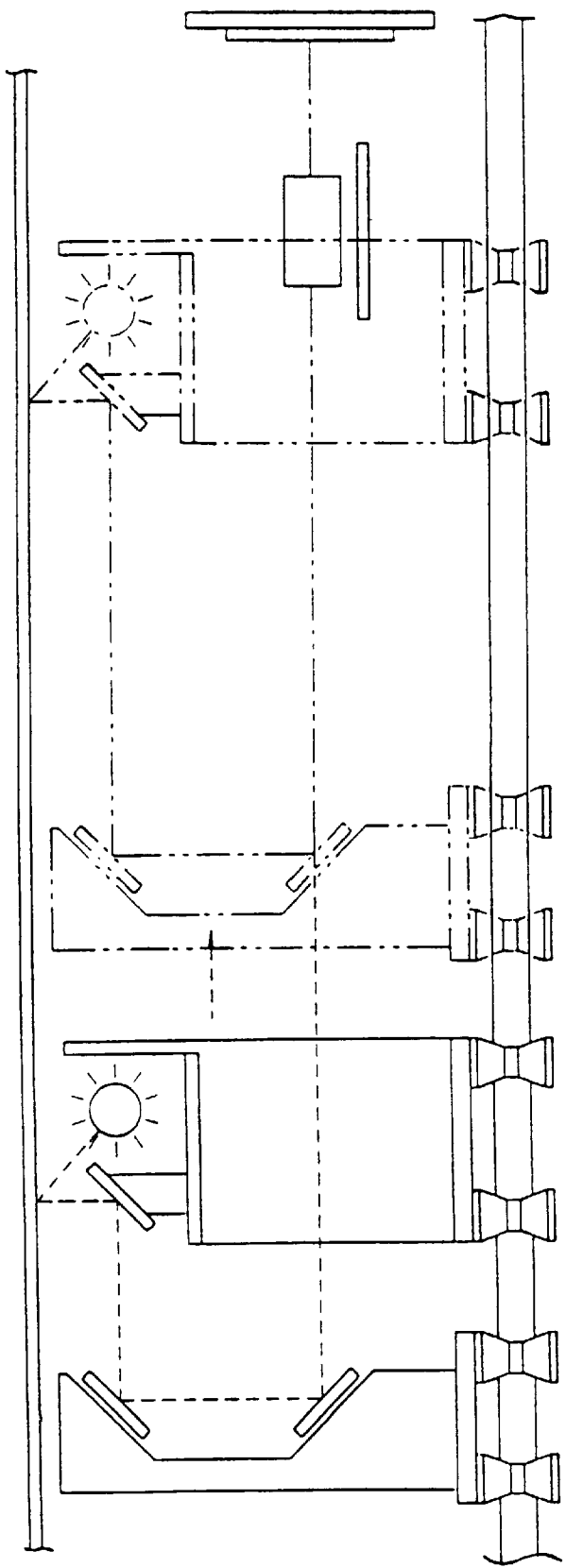
FIG. 1 shows an optical path defined in an optical scanner according to the prior art.
Figure 2A:
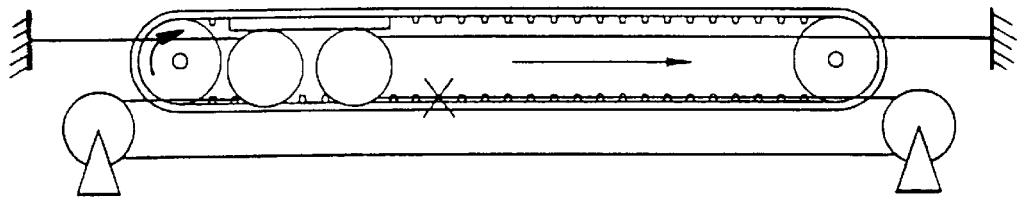

FIG. 2A shows an arrangement of a transmission mechanism for a scanner according to the prior art.

Figure 2B:
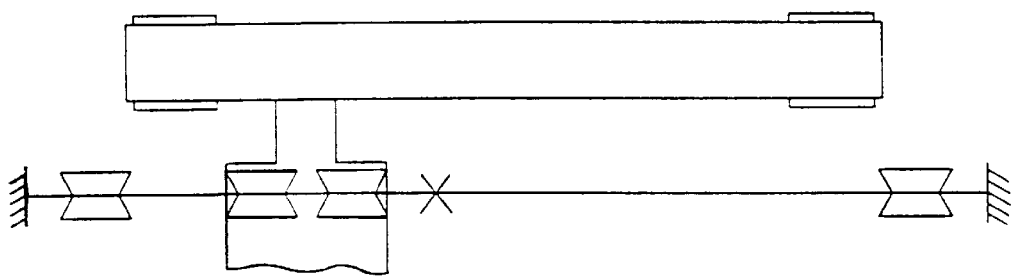

FIG. 2B is a top view of FIG. 2A.

Figure 3A:
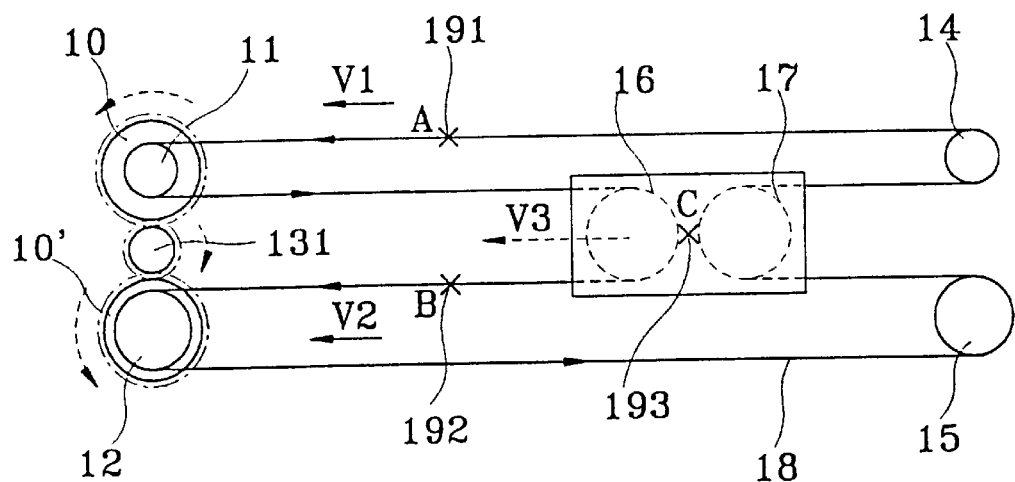

FIG. 3A shows an arrangement of a transmission mechanism for a scanner according to one embodiment of the present invention.

Figure 3B:
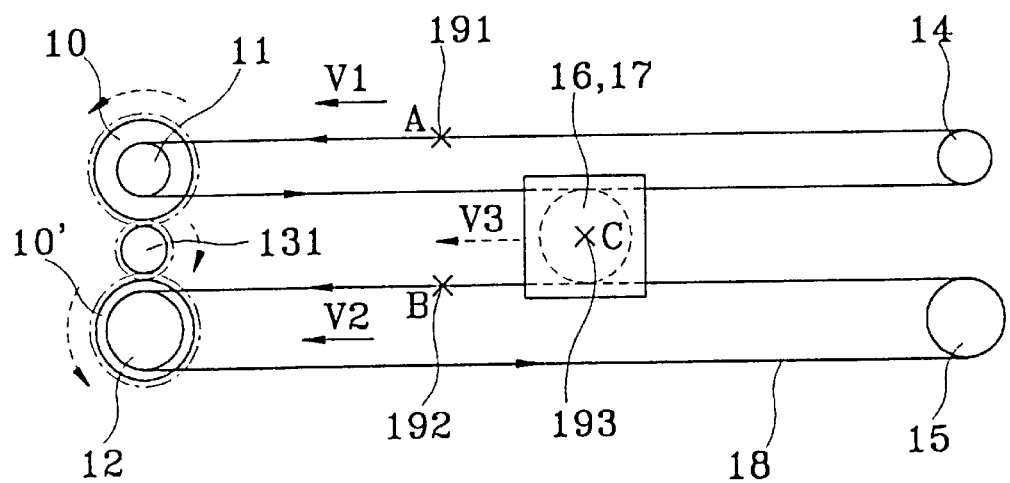

FIG. 3B is similar to FIG. 3A but showing the first movable pulley and the second movable pulley arranged in a stack.

Figure 4A:
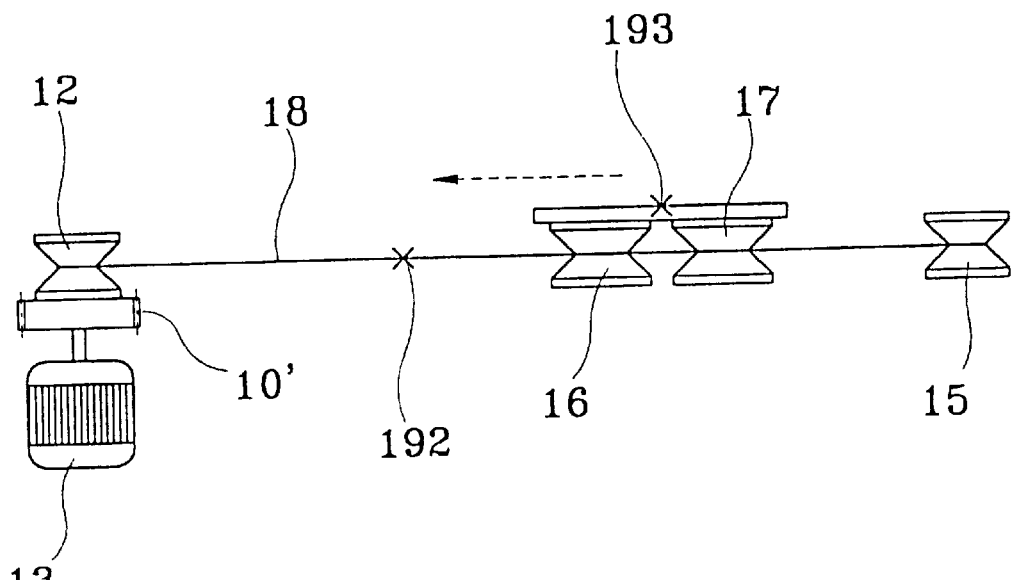

FIG. 4A is a side view of FIG. 3A.

Figure 4B:
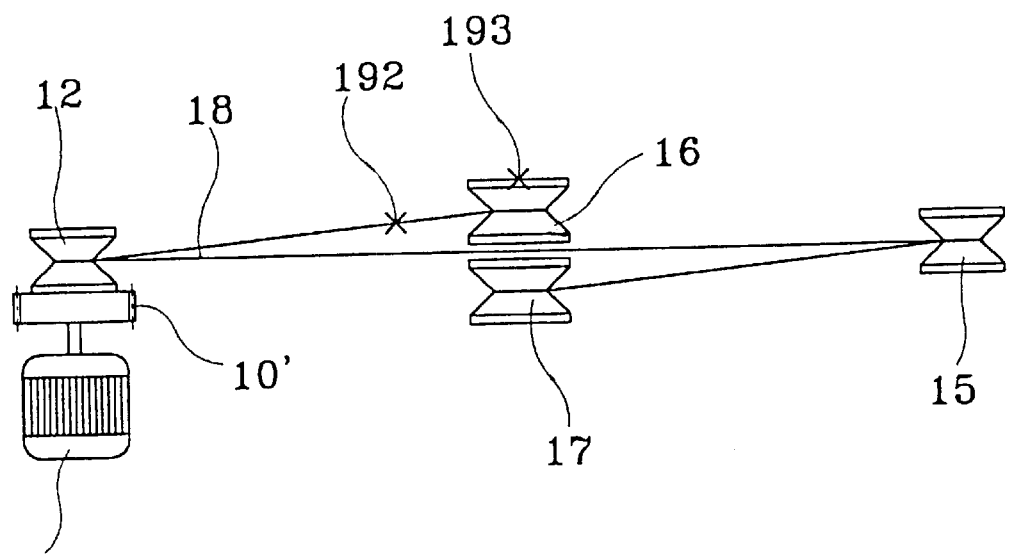

FIG. 4B is a side view of FIG. 3B.

Figure 5:
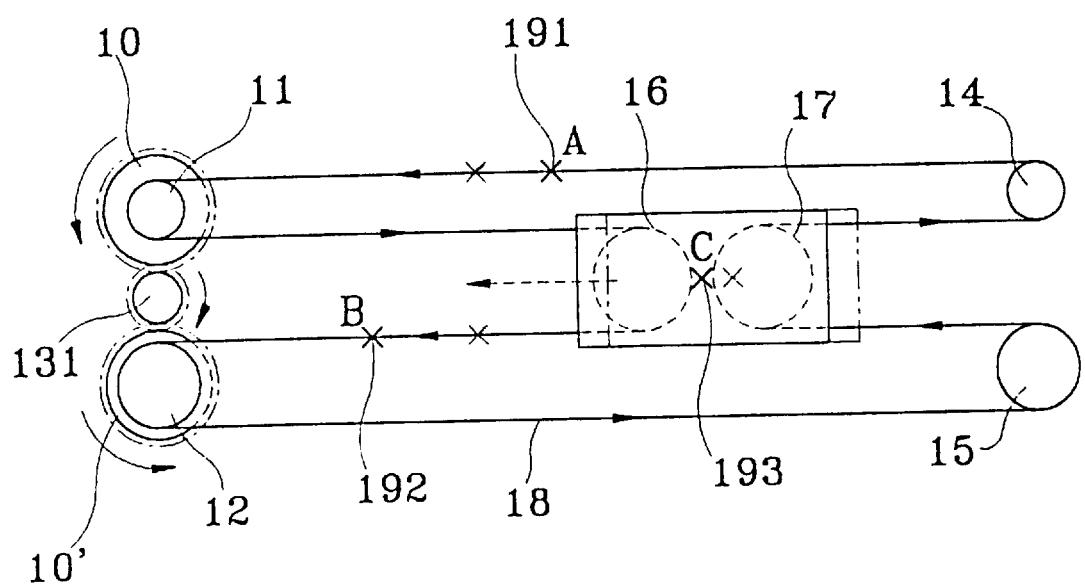

FIG. 5 is similar to FIG. 3A but showing the mechanism operated.

Figure 6:
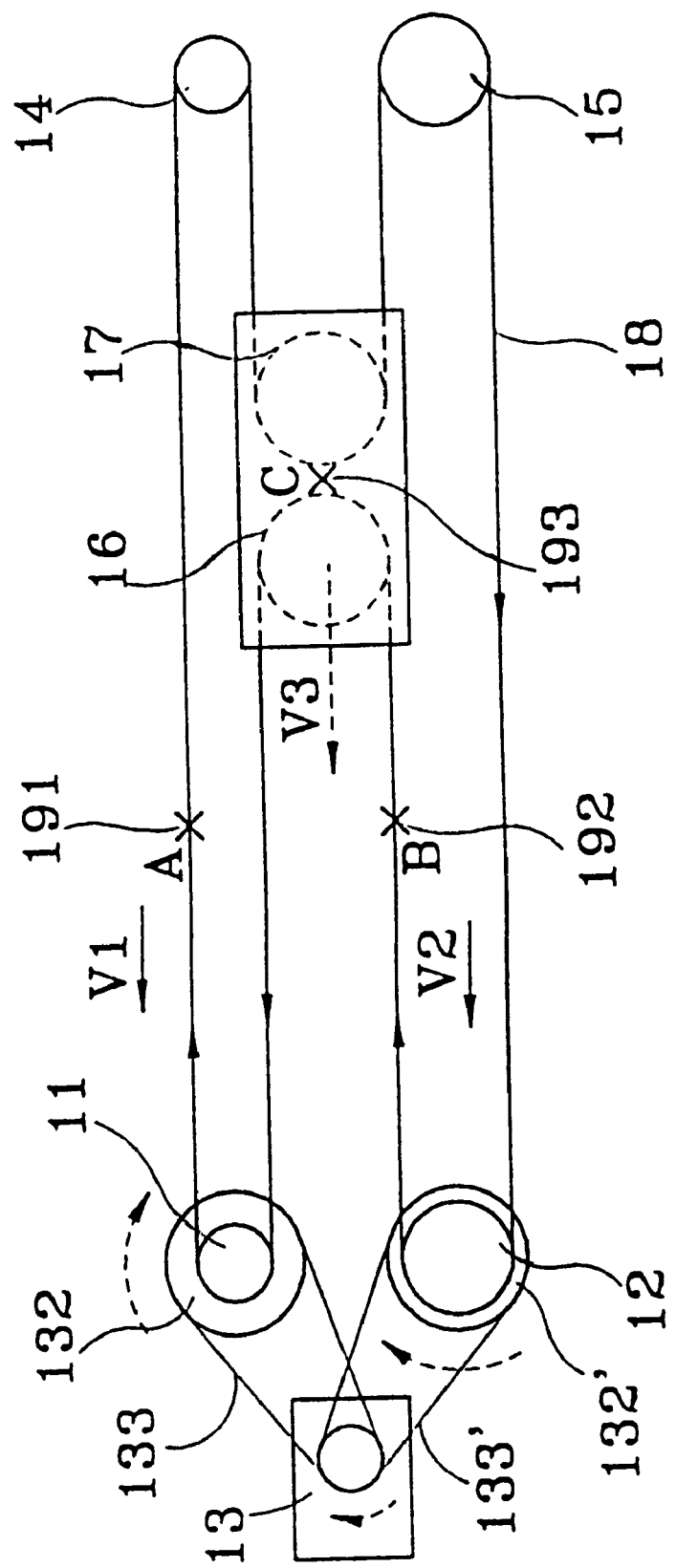

FIG. 6 shows an alternate form of the present invention.

Figure 7A:
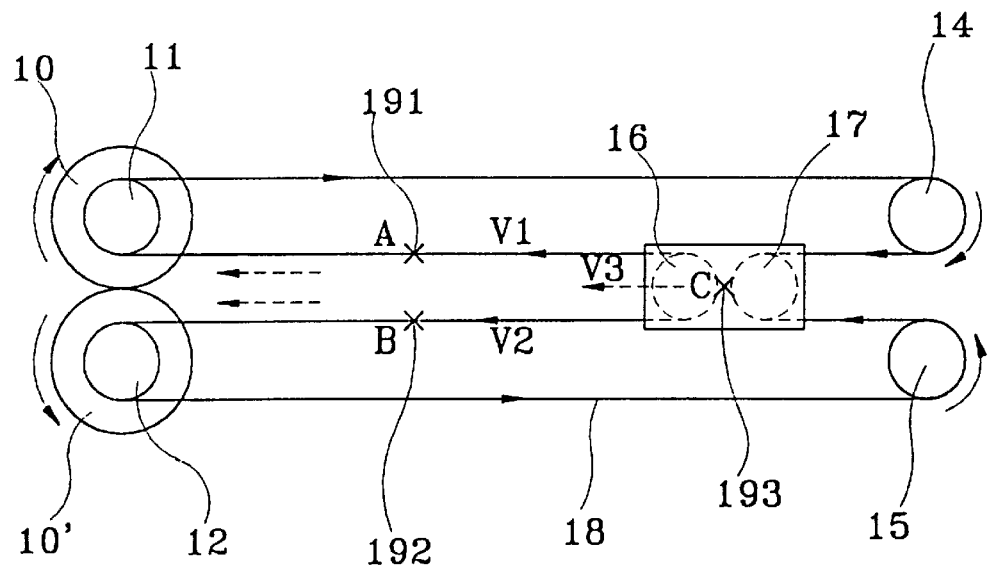

FIG. 7A shows another alternate form of the present invention.

Figure 7B:
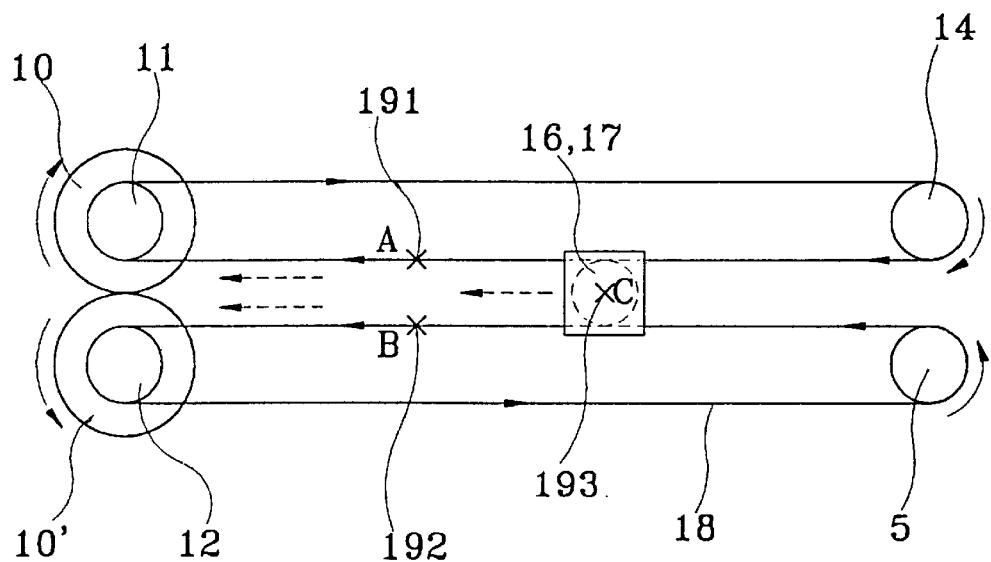

FIG. 7B is similar to FIG. 7A but showing the first movable pulley and the second movable pulley arranged in a stack.

Figure 8A:
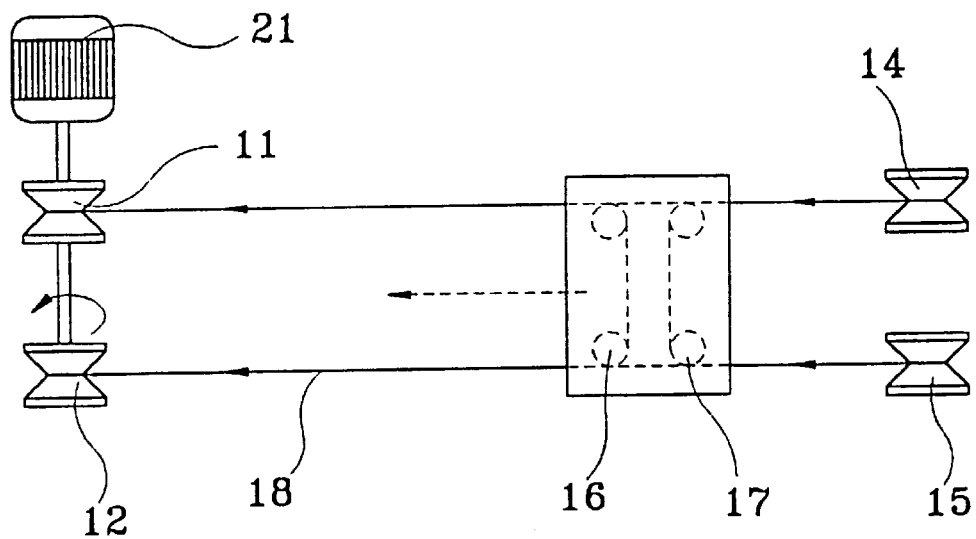

FIG. 8A shows still another alternate form of the present invention.

Figure 8B:
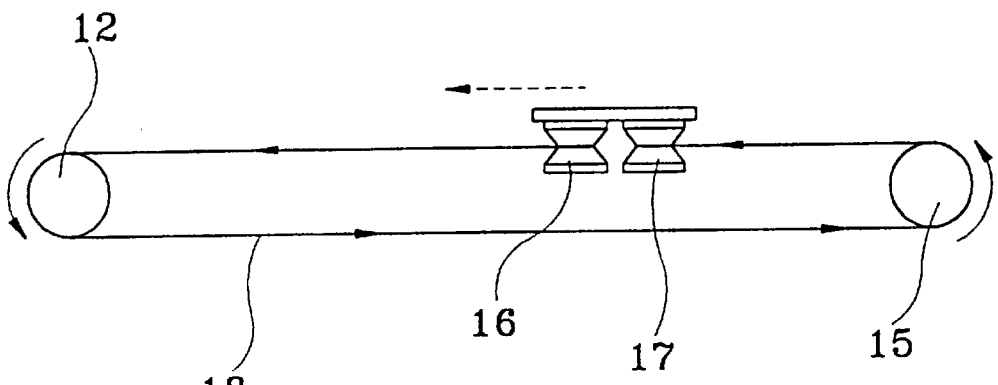

FIG. 8B is a side view of FIG. 8A.

Figure 8C:
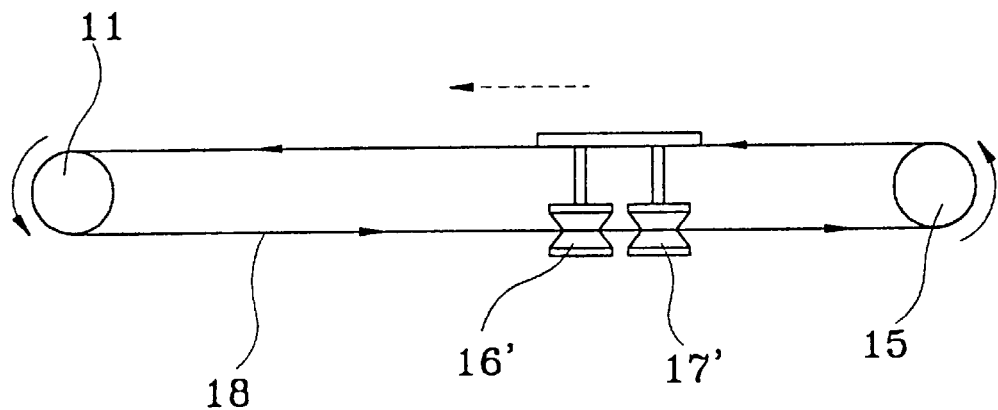

FIG. 8C shows an alternate arrangement of the embodiment shown in FIG. 8A.

DETAILED DESCRIPTION OF THE PREFERRED EMBODIMENT

Referring to FIGS. 3A and 4A, a transmission mechanism in accordance with one embodiment of the present invention is generally comprised of a first gear 10 and a second gear 10' bilaterally disposed at one end of a scanning path defined inside a scanner, an idle wheel 131 meshed between the gears 10;10' for permitting the gears 10;10' to be turned in the same direction, a motor 13 controlled to turn for example the second gear 10', a first fixed pulley 11 and a second fixed pulley 12 respectively mounted on the gears 10;10' for synchronous rotation, a third fixed pulley 14 and a fourth fixed pulley 15 bilaterally disposed at an opposite end of the scanning path, a first movable pulley 16 and a second movable pulley 17 longitudinally arranged in a line and synchronously moved along the scanning path, and a flexible transmission member 18 mounted in proper order on the first fixed pulley 11, the first movable pulley 16, the second fixed pulley 12, the fourth fixed pulley 15, the second movable pulley 17 and then the third fixed pulley 14. The flexible transmission member 18 can be a steel cable, rope, or belt. Alternatively, the first movable pulley 16 and the second movable pulley 17 can be vertically aligned (see FIGS. 3B and 4B).

According to the aforesaid arrangement, different speeds are provided at point A 191, point B 192, and point C 193. Because the first fixed pulley 11 and the second fixed pulley 12 are turned in the same direction, they must provide different tangential velocity so that the first movable pulley 16 and the second movable pulley 17 can be moved smoothly along the scanning path. The tangential velocity of the first fixed pulley 11 and second fixed pulley 12 are determined subject to the design of the revolving speed of the first gear 10 and second gear 10' and the radius of the first fixed pulley 11 and second fixed pulley 12. Assume the first gear 10 and the second gear 10' have same revolving speeds, we can thus design the first fixed pulley 11 and the second fixed pulley 12 to have a different radius r1 and r2. Under this condition, the tangential velocity (velocity at point A 191) of the first fixed pulley 11 is V1=r1x $\bar{\omega}$; the tangential velocity (velocity at point B 192) is V2=r2x $\bar{\omega}$; the velocity at point C 193 (the moving speed of the movable pulleys 16;17) is V3=(V2−V1)/2=(r2$\bar{\omega}$−r1$\bar{\omega}$)/2=$\bar{\omega}$(r2−r1)/2; the speed ratio between point A 191 and point C 193 is V1/V3= r1$\bar{\omega}$/(r2−r1)($\bar{\omega}$/2)=(r1×2)/(r2−r1). Therefore, a different speed ratio can be obtained by changing the radius of the fixed pulleys 11;12. For example, if the radius of the first fixed pulley 11 is one half of the radius of the second fixed pulley 12 (i.e., r2=2r1), the speed ratio between point A 191 and point C 193 becomes V1/V3=(r1×2)/(2r1−r1)=2/1, thus we can use point B to move the scanning mechanism and point C to move the reflecting mechanism, permitting both mechanisms to be moved in the same direction at a ratio of 2:1, so as to positively pick up the image of document (see FIG. 5). The transmission mechanism can also be used for fine displacement adjustment, for example, for adjusting the position of the charge coupled device or the lens. For this application, the charge coupled device or lens is mounted at point C 193 (i.e., on the movable pulleys 16;17), and the difference between the radius of the first fixed pulley 11 and the radius of the second fixed pulley 12 is minimized, and therefore the displacement of point C 193 is slow. If the difference between the radius of the first fixed pulley 11 and the radius of the second fixed pulley 12 is reduced to about within 1mm, point C 193 moves ½ mm when the pulleys 11;12 are turned through one run, and a fine adjustment is thus achieved. If a 1.8° Hybrid step motor which moves 200 steps per run is used, the amount of displacement of point C will be (½ mm)/200=¹⁄₄₀₀ mm=0.0025 mm=2.5 $\mu$m.

FIG. 6 shows an alternate form of the present invention, in which belt wheels 132;132' are installed to replace the aforesaid gears 10;10', and transmission belts 133;133' are coupled between the belt wheels 132;132' and the motor 13. When the motor 13 is started, the belt wheels 132;132' are turned by the transmission belts 133;133' to move the flexible transmission member 18 and the related pulleys.

FIGS. 7A and 7B show another alternate form of the present invention, in which the gears 10;10' are directly meshed together and turned in reversed directions. Under this arrangement, the speed V1 at point A 191 and the speed V2 at point B 192 have the same moving direction, the speed at point C 193 is V3=(V1+V2)/2; the speed ratio V2/V3=r2 $\bar{\omega}$/(r1+r2)/2$\bar{\omega}$=(r2×2)/(r1+r2); the speed ratio V1/V3=(r1× 2)/(r1+r2). According to this arrangement, the gears 10';10' can be turned by a motor through a belt or reduction gear. Using the gears 10';10' to move the fixed pulleys 11;12 ensures a synchronous movement of the fixed pulleys 11;12.

FIGS. 8A, 8B and 8C show still other alternate forms of the present invention, in which the fixed pulleys 11;12 are fixedly mounted on an output shaft of a motor 21, and turned by it to move movable pulleys 16, 16';17,17'. In FIG. 8B, the displacement ratio is calculated in the same manner as that of FIG. 7A; in FIG. 8C, the displacement ratio is calculated in the same manner as that of FIG. 4A.

It is to be understood that the drawings are designed for purposes of illustration only, and are not intended as a definition of the limits and scope of the invention disclosed.

What is claimed is:

1. A transmission mechanism comprising:

a) a first driving wheel means and a second driving wheel means bilaterally disposed at one end of a scanning path defined inside a scanner;

b) a first fixed wheel means and a second fixed wheel means respectively and fixedly mounted on said first driving wheel means and said second driving wheel means;

c) a third fixed wheel means and a fourth fixed wheel means bilaterally disposed at an opposite end of said scanning path;

d) a first movable wheel means and a second movable wheel means synchronously moved along said scanning path;

e) a flexible transmission member mounted in proper order on said first fixed wheel means, said first movable wheel means, said second fixed wheel means, said fourth fixed wheel means, said second movable wheel means and then said third fixed wheel means; and f) a motor, and two transmission belts respectively coupled between said motor and said first driving wheel means and second driving wheel means.

2. A transmission mechanism comprising:

a) a first driving wheel means and a second driving wheel means bilaterally disposed at one end of a scanning path defined inside a scanner, wherein said first driving wheel means and said second driving wheel means are meshed together, and turned in reversed directions;

b) a first fixed wheel means and a second fixed wheel means respectively and fixedly mounted on said first driving wheel means and said second driving wheel means;

c) a third fixed wheel means and a fourth fixed wheel means bilaterally disposed at an opposite end of said scanning path;

d) a first movable wheel means and a second movable wheel means synchronously moved along said scanning path; and e) a flexible transmission member mounted in proper order on said first fixed wheel means, said first movable wheel means, said second fixed wheel means, said fourth fixed wheel means, said second movable wheel means and then said third fixed wheel means.

3. The transmission mechanism of claim 2, wherein said first fixed wheel means and said second fixed wheel means provide a different tangential velocity.

* * * * *